United States Patent Office 3,719,500
Patented Mar. 6, 1973

3,719,500
PREPARATION OF A BREWERS' WORT
Martin Francis Walmsley and John Valentene Cross, London, Ontario, Canada, assignors to John Labatt Limited, London, Ontario, Canada
Filed July 27, 1970, Ser. No. 58,631
Claims priority, application Great Britain, July 25, 1969, 37,462/69
Int. Cl. C12c 7/00
U.S. Cl. 99—52                              10 Claims

ABSTRACT OF THE DISCLOSURE

A brewers' wort is prepared from a mash containing less than about 30% by weight malt by heating a raw cereal grain to 65° C. to about 90° C. in the presence of an added discrete α-amylase enzyme whereby the starch in the grain is solubilized and liquefied. Thereafter, the liquefied mass is cooled to 40° C. to 65° C. at which temperature it is subjected to the action of a discrete proteolytic enzyme to produce soluble nitrogen-containing compounds and a discrete β-amylase enzyme or source thereof to produce fermentable sugars.

This invention also includes a process for the manufacture of beer or like non-distilled alcoholic beverages from such brewers' worts.

---

The present invention relates to the production of a nitrogenous wort for use in the manufacture of non-distilled fermented beverages such as beers, ales, lagers and the like, and to the fermented beverages derived therefrom. More particularly, it is concerned with the production of a nitrogenous wort in a novel and advantageous manner, and to the fermented beverages derived therefrom.

The production of such beverages normally involves, as is well known, the initial formation of a wort in a mashing process followed by a fermentation process in which fermentable sugars such as maltose present in the wort are converted into alcohol and carbon dioxide. In the brewing of beer, the wort is commonly produced by mashing a slurry of barley malt and adjuncts such as prepared cereals, unmalted raw cereal grains such as corn and rice, or some other carbohydrate source. Unmodified starch-bearing materials such as raw corn grits, must be pre-cooked in a separate cooker before being added to the mash. This is generally done by mixing them with water and finely ground malt, and then boiling the mixture. The malt liquefies the starch material, thereby permitting the subsequent conversion of starch to sugar during the mashing operation.

In the mashing operation itself, the malt, by virtue of enzymes present therein, plays an important role. Thus, α-amylase liquefy the starch material of the grain producing mainly non-fermentable sugars like dextrin, while β-amylases saccharify the liquid starch to fermentable sugars, principally maltose. Further, proteolytic enzymes present therein break down the high molecular weight proteins to form lower molecular weight peptides and also significant amounts of amino acids and other intermediate fractions. These decomposition products of proteins not only provide nutrients for the subsequent yeast growth, but also contribute toward characteristic properties of the beer, for example, foam and haze stability, and a smooth mellow palate.

This reliance upon malt, which is a feature of present practice, is attended by several significant disadvantages. For instance, the material is relatively expensive because of the high cost of barley of malting quality, the time and cost of converting barley into barley malt, and especially because of the investment, in both plant equipment and labor associated with its production. Moreover, malt contains husks (8–12%), and typically about 2 to 3% of a viscous, fatty liquid which tend to impart an inferior colour and a bitter taste to the wort. Further, the plant required for malting in this way tends to be complex and expensive.

For some time now, the brewing art has recognized these factors, and proposals have been made to lessen the importance of malt in the manufacture of a nitrogenous wort. Thus, in the specification of our British Pat. No. 977,592, a brewers' wort is described which is obtained from a mash of raw cereal grains, for example, barley, treated with a commercially available mixture of proteolytic and diastatic enzymes, in partial or complete replacement of the malt. The mash is held at temperatures at which the added enzymes firstly degrade the protein and then convert the solubilised starch to sugar.

This process, which has been successfully employed in making acceptable beer, offers a very substantial decrease in production costs since unmalted barley or corn, or similar starch material may be used to supply substantially all of the carbohydrate needed for fermentation instead of the more costly malted grain.

This invention is concerned with such an enzymatic treatment of raw cereal grains to produce a nitrogenous wort. The primary object thereof is to provide an enzymatic process which results in a higher concentration of readily fermentable sugars (increased attenuation) and increased formol nitrogen contents compared with the process described and claimed in the aforementioned specification. These nitrogenous worts, when subsequently fermented, give, on a more reproducible basis, beer with a superior flavour and other properties, for example, head, than beer brewed from wort made according to the aforementioned prior art process.

Accordingly, this invention, in one of its aspects, provides a process for producing a nitrogenous wort which comprises commingling an aqueous slurry of cereal grains, for example, ground barley, wheat or corn, with a discrete α-amylase enzyme, preferably in an amount of at least 45 α-amylase units per gm. of cereal grain, holding said mixture at a temperature of between about 65° and about 90° C., preferably between about 75° and about 85° C., whereby the α-amylase enzyme liquefies the starch of the cereal grains, then, with the temperature of the medium at between about 40° and about 65° C., preferably between about 50° and about 60° C., introducing simultaneously or consecutively a discrete proteolytic enzyme preferably in an amount of at least 0.5 protease unit per gm. of cereal grain and a β-amylase enzyme or source thereof, whereby the proteolytic enzyme converts protein into soluble nitrogen compounds and the β-amylase enzyme converts starch into fermentable sugars and, finally, separating the wort so-obtained from the residual solid material (spent grains).

A preferred process according to this invention includes the addition to the aqueous cereal grain slurry of a cereal adjunct at the beginning of the process or at, or toward, the end of the initial treatment involving α-amylase. This adjunct may take the form of a liquefied mass of unmodified starch-bearing cereal grains such as corn grits, corn meal, rice flour and the like which may have been pre-cooked in a separate vessel, especially when the adjunct is added after the initial treatment. Alternatively, it may take the form of prepared, i.e. gelatinised, starch-bearing grains such, for example, as corn starch and corn flakes. Preferably, the cereal adjunct is introduced in an amount of between about 10 and about 60%, more preferably between about 42 and about 55%, by weight, based on the weight of the adjunct cereal grains relative to the weight of cereal grain substrate in the aqueous slurry.

The expression "discrete enzyme" as used herein in relation to the protease and α-amylase enzymes refers to an enzyme which has been extracted from a source material therefor, and which manifests a significant protease and/or α-amylase activity as the case may be. Other enzymes, aside from the protease and/or α-amylase may also be present.

The determination of α-amylase and protease activities to which reference is made in this specification involve specific biochemical assays as follows:

α-Amylase

This activity is measured by determining with 3,5-dinitro-salicylic acid the amount of reducing sugars (maltose) formed from solubilised starch under specific conditions of pH, temperature and time. The method employed is essentially that described by Stein and Fischer, Journal of Biological Chemistry, 232, 869 (1958) modified in the following respects:

Merk soluble starch according to Lintner is used;
1% starch, as substrate, is made up in distilled water;
Enzyme dissolved and diluted in 0.05 M acetate buffer—pH 6.0;
Incubation is at 37° C. for 5 minutes; and
Reaction mixture is diluted with 10 ml. water.

In this assay, an α-amylase unit is the amount of enzyme necessary to produce 1 microequivalent of maltose in one minute under the conditions of the assay.

Protease

In essence, the protease activity is measured by determining with Folins reagent (available from Fischer Scientific as So–p–24 Phenol Reagent Solution 2 N) the amount of trichloroacetic acid (TCA) soluble tyrosine liberated from a casein substrate under specific conditions of pH, temperature and time. The method employed is essentially that described by Kunitz, Journal of General Physiology, 30, 291 (1947), modified in the following important respects:

2% casein in 0.066 M phosphate buffer—pH 7.0;
2 mls. enzyme and 2 mls. substrate are used in the enzyme reaction;
Enzyme reaction time is 10 minutes at 37° C.;
Precipitation is achieved with 4 mls. 0.4 M T.C.A.; and
The precipitated protein is separated using Whatman No. 42 filter paper.

In this assay, a protease unit is the amount of enzyme necessary to produce 1 microequivalent of TCA soluble tyrosine in one minute under the conditions of the assay.

DETAILED DESCRIPTION OF THE INVENTION

Materials And Their Function

Starch-containing material

Although starch-containing-materials other than cereals grains, such for example, as buckwheat, may be used, grains such as degermed corn, rye, rice, wheat, barley or mixtures thereof are preferably used as the substrate. Barley is the preferred cereal substrate as its digestion products after enzymatic attack most closely correspond to the nitrogen and carbohydrate spectra of a conventional brewers' wort derived from malt. In addition, barley starch is gelatinised at relatively low temperatures, thus permitting its rapid degradation before appreciate heat deactivation of the amylases occurs. Further, the barley enzymes, such as β-amylase, which are released and activated during the process are believed to play an important role in producing fermentable sugars. We have found that the grain size markedly influences the enzymatic process. Thus, generally speaking, the finer the grain size, the less enzyme is required for digestion, but the more difficult the subsequent filtration and sparging using conventional brewery mash or lauter filters. Consequently, a system based on fine cereal grains tends to involve low enzyme concentration but high filtration costs. On the other hand, coarser grains, though easier to filter using conventional filter equipment, usually demand a high enzyme concentration. In practice, we have found that a satisfactory compromise between enzyme concentration and amenability of the wort to subsequent filtration on standard filtration equipment may be attained by grinding the grains to a particle size such that the bulk of the particles pass through a No. 14 Screen (U.S. Standard Sieves), i.e. have an average particle size of less than 1.41 mm. If desired, the cereal grains, such as barley, may be heated, for instance, to between 120° and 170° F., or treated with suitable chemicals, before slurrying.

Enzymes (1) Protease: The discrete protease enzyme may be derived from a bacterial, fungal, plant or animal source, though bacterial proteases are preferred. Bacterial proteases may, for example, be derived from any of: *Bacillus subtilis; Bacillus amyloliquefaciens; Bacillus polymyxa; Bacillus megaterium* and *Bacillus cereus.* Fungal proteases may, for example, be derived from any of: *Aspergillus niger; Aspergillus oryzae; Aspergillus tamarii;* and *Rhizopus* sp.

The plant or animal protease may, for example, be pepsin, papain, trypsin, bromelain, ficin or pancreatin; many of which proteases are readily available commercially. We have found that it is desirable for the protease enzyme to include both neutral and alkaline protease components for this is usually advantageous in promoting digestion of the starch and solubilization of the grain protein with the release of small chain peptides and the obtention of a satisfactory spectrum of amino acids (it is believed that the two types of proteases, which display optimum activity at different pH values, are responsible for the release of different types of amino acids).

The protease enzyme under suitable conditions serves to convert high molecular weight proteins in the starch of the cereal grains to soluble nitrogen containing compounds such as peptides and amino acids. These decomposition products of proteins not only provide nutrients for the subsequent yeast growth, but also contribute toward characteristic properties of the beer, for example, foam, and a smooth mellow palate.

(2) α-Amylase: The discrete α-amylase enzyme may be derived from a fungal or bacterial source as, for example, from any one of *Bacillus substilis; Bacillus amyloliquefaciens, Bacillus coagulans, Bacillus polymyxa, Bacillus megaterium, Bacillus cereus, Aspergillus oryzae, Aspergillus niger* and *Rhizopus* sp.

The α-amylase enzymes under suitable conditions are usually highly active in digesting the starch by acting upon, and breaking down, amylose and amylopectin polymers of which starch is composed. The former is an unbranched polysaccharide consisting of long chains of α-(1→4) linked glucose units, and the latter a branched polysaccharide polymer consisting of short chains of α-(1→4) glucose units joined in the (1→6) position to form a large molecule. The α-amylase enzyme randomly hydrolyses α-D-(1→4) linkages in amylose and amylopectin molecules, but does not attack (1→6) linkages. Consequently, α-amylases effect a rapid fragmentation of starch with the production first of branched oligosaccharides of medium molecular weight and, later, of branched limit dextrins. The final products of starch digestion are a large amount of limit dextrins and smaller amounts of glucose and maltose. The primary effect of the α-amylase induced fragmentation is to solubilise, i.e. liquefy, the starch so facilitating contact between the cereal grains and the other enzymes.

(3) α-Amylase and protease mixture: With a suitable bacterial species, and using appropriate fermentation conditions, a discrete enzyme mixture comprising a complex of extracellular protease and α-amylase enzymes may be isolated, and such a mixture may be used as the source of α-amylase. The specification of our co-pending application No. 52,999 filed on July 7, 1970 describes the preparation of such an enzyme complex by fermentation using a bacterium of the genus Bacillus, conveniently a new strain of *Bacillus subtilis* designated ATCC 21556. The discrete enzyme mixture may be used in the form of the fermentation broth, which optionally may be concentrated, say by evaporation. Alternatively, the enzyme complex may be used in solid form, preferably in conjunction with a carrier, for instance, in the form of a spray dried broth or as a precipitated solid blended with an inert carrier such as starch, gypsum, diatomaceous earth or the like.

Preferably, the enzyme mixture takes the form of an enzyme complex obtained by the fermentation of a suitable microorganism, conveniently a bacterium of the genus Bacillus, followed by isolation of the extracellular enzymes. Quite surprisingly, it has been found that if bacterium of the genus Bacillus is grown in a nutrient medium containing a carbon source, a nitrogen source and inorganic salts, an enzyme complex is obtained containing the desired neutral and alkaline protease and α-amylase enzymes in good yields and at concentration levels that are convenient for the subsequent enzymatic conversion process, and in which the ratio of amylase: protease may be readily controlled and, if need be, adjusted during the fermentation to a value desired for the conversion process. Thus, this fermentation process permits the direct production of an enzyme complex containing alkaline and neutral protease and α-amylase well adapted for use in the conversion process, without the need for subsequently balancing the protease:amylase ratio.

Particularly good results are obtained when the bacterium used is a strain of the species *Bacillus subtilis* and, in a preferred embodiment of this invention, the enzyme complex is derived from the submerged fermentation in a suitable nutrient medium of the new strain *Bacillus subtilis* ATCC 21556, or a natural or artificial variant or mutant thereof.

The medium used for the fermentation may be either a natural or artificial medium containing at least one carbon source, a nitrogen source, and inorganic salts. As a carbon source, there may be used a mono, di, or polysaccharide which is assimilable by the bacterium, for example glucose, lactose, flour, soya bean meal, Pharmamedia, bran, casein or casein hydrolysates. As examples of inorganic salts, magnesium salts, calcium salts, manganese salts, zinc salts, and various phosphates may be cited. It has been found preferable to use a combination of mono or di, and polysaccharide as a carbon source, for example 0.5% lactose and 2.5% starch. Although inorganic salts may be preferred as a source of nitrogen, organic derivatives generally result in higher yields.

Fermentations may be carried out in submerged culture in fermenters of conventional design or in shaken flasks. The fermentation is inoculated with bacteria from either a solid or liquid seed stage, and incubated at a temperature of 30–45°, preferably 36° C. for a period of 28–40 log hours. The culture is aerated, for example, at 0.2–1.0 v./v. per minute, and agitated sufficiently to ensure no limitation in oxygen transfer rates. Standard methods applicable to the art of fermentation, e.g. sterilization procedures and cycles, antifoam control etc. are utilized.

The ratio of amylase to protease, if need be, may be adjusted by several means during the manufacture. Such methods include alteration of medium constituents, temperature of incubation, pH, rate of agitation, rate of aeration, harvest time, as well as other procedures.

At the conclusion of the fermentation, the enzyme complex is extracted by conventional means, as by centrifuging and, if need be, filtration. The broth so-obtained usually does not impart any adverse flavour to the ultimate beer, so that it is generally convenient simply to employ the broth itself, if desired after concentrating using, for instance, an evaporator, as the source of the enzyme complex. Stabilizing agents such, for example, as potassium sorbate, glycerol, propylene glycol or sodium benzoate may be added in suitable small amounts to the broth. Alternatively, the enzyme complex may be used in solid form, preferably in conjunction with a carrier, for instance, in the form of a spray dried broth or as a precipitated solid blended with an inert carrier such as starch, gypsum, diatomaceous earth or the like.

Calcium ions usually enhance the resistance of both protease and amylase enzymes to inactivation by heat and, accordingly, to promote enzyme stability during the conversion process, a calcium salt, say calcium carbonate, is often incorporated at a convenient stage in the derivation of the enzyme mixture, or at a later stage.

EXAMPLE A

Preparation of a discrete enzyme complex

An inoculum of *Bacillus subtilis* was prepared by transfering organisms from a nutrient agar slant, or similar suitable growth medium to a sterile seed medium consisting of casein hydrolysate (2%), calcium chloride (0.01%) and potassium dihydrogen phosphate (0.1%) adjusted to pH 6.0. The medium (100 ml.) was dispersed into an Erlenmeyer shaken flask (300 ml.). The broth was sterilized, inoculated, and incubated for a period of 40 hours at 36° C. on a reciprocal reactor (200 r.p.m.). Upon completion of the fermentation the broth was recovered by filtration using conventional techniques and monitored for amylase and protease activity by the assay procedures indicated hereinbefore:

Results:
  Amylase activity: 1420 modified Stein-Fischer units/ml.
  Protease activity: 18.68 modified Kunitz units/ml.
  Neutral protease:* 8.26 modified Kunitz units/ml.
  Alkaline protease:* 10.42 modified Kunitz units/ml.
  Amylase:protease ratio: 113:1.

*The sample is assayed for total protease both in the presence and absence of an inhibitor (phenylmethyl sulfonylfluoride) which destroys the alkaline protease activity. Thus, the alkaline protease value is given by the difference between the total and neutral protease readings.

EXAMPLE B

Preparation of culture filtrate

An inoculum of *Bacillus subtilis* growth medium was transferred to a seed medium of the type specified in the foregoing example. The seed fermentation was carried out in a 15 l. vessel of conventional design. The fermentation was incubated at 36° C. (airflow 1.0 s.c.f.m., agitation 400 r.p.m. using 2 x 2½" diameter turbine impellors) until a satisfactory growth was obtained (8–12 hours). It is usually necessary to incorporate some form of antifoam such as commercially available silicone in order to minimise foaming problems. The mature seed (1% w./v.) was transferred under sterile conditions to the production medium consisting of wheat starch (2.1%), corn steep liquor (6.9%), lactose (0.71%), magnesium sulfate (0.05%), calcium carbonate (0.5%) and potassium dihydrogen phosphate (0.6%), adjusted to pH 6.2 prior to sterilization. The fermentation was carried out in a 1000 litre fermenter of conventional design, incubated at 36° C., agitated at 186 r.p.m. and aerated at 0.6 s.c.f.m. for a period of 36 hours. Upon completion of the fermentation, the broth was recovered by centrifuging at a bowl gravity of 8,000, and then filtering to give a sparkling filtrate. Enzyme analyses gave the following results:

Amylase activity: 1600 modified Stein-Fischer units/ml.
Protease activity: 12.5 modified Kunitz units/ml.
Neutral protease: 7.7 modified Kunitz units/ml.
Alkaline protease: 4.8 modified Kunitz units/ml.
Amylase:protease ratio: 128.1.

The broth was stabilised by the addition of propylene glycol (5.0% w./w.) and potassium sorbate.

Bacillus subtilis ATCC 21556 is deposited as ATCC strain number 21556 with American Type Culture Collection, 12301 Parklawn Drive, Rockville, Md., 20852. The deposit will be maintained during the life of any patent issuing on this application. The microorganism is a nutrient derived from fermentation of bacterium from the species Bacillus subtilis, or, more specifically, a discrete enzyme mixture comprising a complex of extracellular protease and α-amylase derived from a bacterium genus Bacillus, species Bacillus subtilis.

(4) β-Amylase: The β-amylase may be derived from various plant sources such, for example, as barley, soybeans and sweet potato, employing standard extraction techniques, or from fungal sources. Advantageously, a ground malt or malt extract is used as the source of β-amylase, for it is found that the use of malt, especially barley malt, inheres with the additional advantage of assisting in imparting characteristic flavour factors to the wort and to the beer derived therefrom, and is also thought to promote stability. Further, malt has α-amylase as well as limit dextrinase activity. These enzymes are made available during processing and assist in decomposing the grain converting it into wort. Whilst the malt may be present in an amount of up to 30% by weight, we have found that between about 8% and about 20%, say, between about 8% and 12%, by weight give optimum results consistent with the desideratum of a low malt content. Conveniently, the malt employed is a barley malt with a diastatic activity of between about 50° and 140°, typically 100° and 140° Lintner. Normally, the malt is employed in ground form, preferably with a particle size such that about 70% or more passes through a No. 14 Screen (U.S. Standard Sieves).

The β-amylase enzyme, or source thereof, under suitable conditions, attacks at the non-reducing ends of the amylose and amylopectin chains in the starch, and proceeds by stepwise removal of maltose units. An inversion of the D-glucosidic linkage occurs, and the maltose liberated is of the β-configuration. Amylose with an even number of D-glucose units is converted completely to maltose while amylose with an odd number of units is converted to maltose and maltotriose which contains the reducing D-glucose unit of the original amylose chain. Amylopectin is hydrolysed like amylose beginning at the non-reducing ends of the outer chains, though (1→6) linkages present in the amylopectin are not attacked by the amylase and remain as residual or branched-limit dextrins. The main effect of the β-amylase attack is to produce reducing sugars, principally maltose, which are available for subsequent conversion, in the fermentation process, to alcohol.

Calcium ions usually increase the resistance of these enzymes to deactivation by heat and, accordingly, to promote enzyme stability during the process, a calcium salt, say calcium carbonate, or chloride, is often included along with the enzyme(s) or added to the water in cases where the calcium hardness of the water falls much below 200 p.p.m.

(5) Enzyme levels: With regard to the levels of amylase and protease enzymes needed for the conversion we have found that the consistent improvement in wort and beer properties associated with this invention requires that the α-amylase enzyme should be present at an enzymatic level of 45 modified Stein-Fischer α-amylase units, preferably around 100 α-amylase units, per gm. of cereal grain substrate.

At amylase levels of less than about 45 amylase units per gm. of starch-containing material, we find a marked reduction in starch degradation. This is reflected in a decrease in the gravity and soluble carbohydrate, such as fermentable sugar content, so that the resulting wort has a diminished extract value (lower °P) and fermentability (Q.F.), and the beer obtained from such a wort has a reduced alcohol content. There is also an adverse affect on flavour and stability. The experimental data indicates an optimum amylase level, at around 100 amylase units per gm. varying between about 75 and 125 α-amylase units per gm. depending on other variables such, for example, as protease, compatible with the obtention of a satisfactory brewers' wort and a good beer in an economically favourable process.

The protease enzyme should be present at an enzymatic level of 0.5 or more, preferably at least 0.9, protease unit per gm. of cereal grain substrate.

At protease levels of less than 0.5 units per gm. there is inadequate protein solubilization of the cereal grains inhering with a poor breakdown of the high molecular weight proteins and a poor release of bound carbohydrates from the starch granules. The net result is that the wort so-obtained has a reduced content of soluble nitrogen-containing compounds like amino acids, and small peptides and a reduced content of carbohydrates such as fermentable sugars as reflected in the Quick Fermentation test (Q.F.—determined by the Fermentable Extract procedure set forth in A.O.A.C. Methods 10.120b) and attenuation data. We have found that these effects often show up in the finished beer which tends to have a low nitrogen content, which can cause flavour and other problems, and a reduced alcohol content. Further, with a protease level below 0.5 unit per gm. the mash is difficult to filter and protracted lautering times are needed using standard brewery equipment. Apart from a minimum activity level, the experimental evidence indicates that there exists a maximum protease level compatible with a desired degree of protein solubilization and the obtention of a satisfactory brewers' wort and good beer, at around about 2 to 2.5 protease units per gm. At protease levels much in excess of 2 to 2.5 protease units per gm. the total nitrogen content in the resulting wort, at around 1000 to 1400 mg./litre, is so high that the finished beer has poor haze and foam stability as well as an unappealing "flat" flavour. Further, at protease levels in excess of 2 to 2.5 there is no material improvement in yield and attenuation values over the values obtained at lower protease levels.

Further features connected with individual steps in the overall process will now be further described, and, at a later passage herein, reference will be made to FIGS. 1 to 4 of the accompanying drawings wherein.

Aqueous slurry

Figure 1:
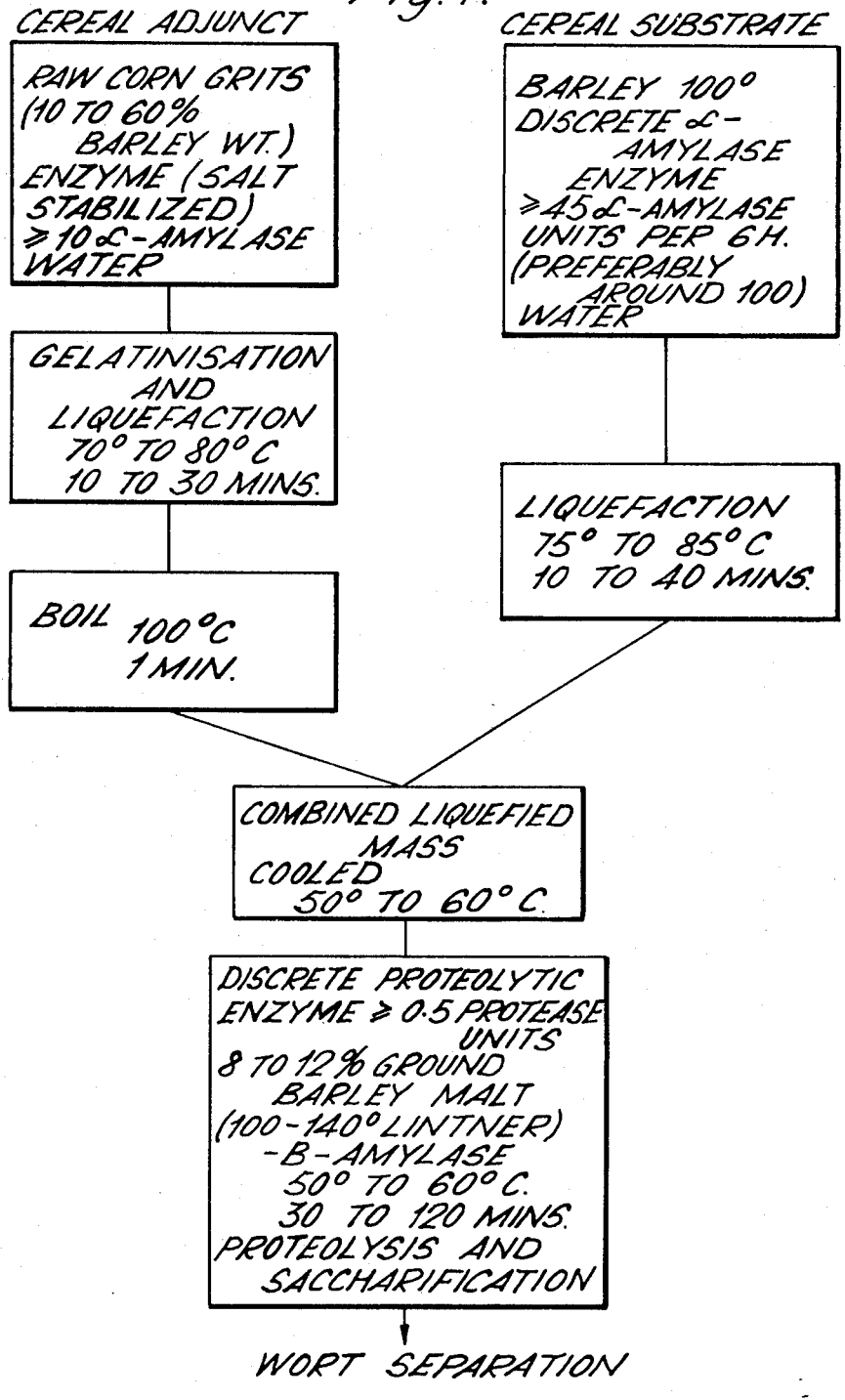
FIG. 1 is a flow sheet showing the various process steps and their integration in the overall sequence, in a preferred embodiment according to this invention.

The α-amylase enzyme, advantageously at the preferred enzymatic level of at least 45 and preferably around 100 α-amylase units per gm. of cereal grain substrate, is thoroughly intermingled with the cereal grain substrate in the slurry.

The barley is preferably present in the slurry at a concentration of between about 20 and about 40 gms. per 100 cc. water (ratio=1:2.5 to 1:5), more preferably about 29 gms. to 33 gms. per 100 cc. water (ratio=1:3.0 to 1:3.5). Preferably the hardness of the slurry water is between 20 and 35 equivalent parts by weight of Ca and Mg carbonates per 1,000,000 parts by weight of water; if the hardness is less than about 20 p.p.m. then calcium chloride or some other calcium salt may be added to increase the hardness. The addition of calcium ions, in the form of a salt, at this stage for the purpose (aside from increasing the hardness) of enhancing the heat stability of the enzymes offers a convenient alternative to their incorporation during enzyme preparation. The pH of the water is preferably adjusted to between about 5.5 and about 7.5, more preferably between about 6 and 7.

Cereal adjunct

Preferably, a cereal adjunct is used in the process of this invention. The use of such a cereal adjunct permits substantial cost savings, at the same time, is considered to give a paler coloured beer with a better shelf life.

The cereal adjunct may be derived from raw or unprepared starch-bearing cereal grain such, for example, as corn grits, corn meal, wheat flour, barley flour, rice, rice flour and meal and the like. Alternatively, prepared, i.e. pre-gelatinised starch-bearing cereal grains such, for example, as corn flakes, barley flour and the like may be used. The cereal grains should be used in an amount of between about 10 and about 60%, preferably between about 42% and about 55%, by weight relative to the weight of cereal substrate, for example, barley, in the initial step, so that the cereal substrate:adjunct ratio in the final mash bill is between 90:10 and 63:37. More commonly, in practising this invention, the cereal substrate: adjunct ratio is between about 65:35 and 70:30. The relatively high adjunct contents which can be accommodated by this process normally give worts with satisfactory nitrogen contents.

The cereal adjunct, particularly when in the form of prepared cereal grains, may be introduced directly into the main mass. Alternatively, the cereal adjunct may be introduced into the medium after the initial heat treatment involving α-amylase. In this event, the raw cereal grains should desirably be subjected to a heat treatment prior to the introduction, in order to gelatinise the starch thereby making it available for subsequent liquefaction and, when combined with the main mass, saccharification. This may be accomplished by pre-cooking the cereals in a separate vessel, commonly termed the cereal cooker.

The pre-cooking operation may be performed by mixing the raw cereal grains, for instance, corn grits, with water and either finely ground barley malt or a suitable discrete α-amylase enzyme. The mixture is heated at about 70° to about 80° C. for about 10 to 30 minutes to gelatinise htestarch and liquefy it by the action of α-amylases derived from the malt or the discrete enzyme, and then boiled. When barley malt is employed in the pre-cooking operation, it is normally added in an amount of between 10% and 25% of the raw cereal grains. Preferably, however, a discrete α-amylase enzyme is employed in the cooker operation. Conveniently, the same α-amylase source as used in the treatment of the cereal substrate, is utilised as the source of α-amylase in this cooker operation. We have found that for satisfactory liquefaction in pre-cooking, it is adequate if the enzyme or enzyme mixture is used at a level of at least 10 amylase units/gm. of raw cereal grains, for instance, at 14 to 16 amylase units/ gm. of raw cereal grains.

With the α-amylase enzyme, and optionally the cereal adjunct present in the medium, the temperature thereof is raised to between about 65° and about 90° C., preferably between about 75° and about 85° C.

At such temperature, the α-amylase is highly active in digesting the starch by acting upon, and breaking down, amylose and amylopectin polymers of which starch is composed. The former is an unbranched polysaccharide consisting of long chains of α-(1→4) linked glucose units, and the latter a branched polysaccharide polymer consisting of short chains of α-(1→4) glucose units joined in the (1→6) position to form a large molecule. The α-amylase randomly hydrolyses α-D-(1→4) linkages in amylose and amylopectin molecules, but does not attack (1→6) and (1→3) linkages. Consequently, the α-amylases effect a rapid fragmentation of the starch with the production first of branched oligosaccharides of medium molecular weight and, later, of branched limit dextrins. The final products of starch digestion are a large amount of limit dextrins and smaller amounts of glucose and maltose. The net effect of the α-amylase induced fragmentation is to solubilise, i.e. liquefy, the starch, so facilitating physical contact between the cereal grains and the protease and saccharifying β-amylase enzyme subsequently to be incorporated.

The medium is held within this temperature range until the starch has been adequately solubilised and the viscosity reduced to the appropriate level. Usually between about 10 and about 90 minutes, more commonly between about 10 and about 40 minutes, at such a temperature results in an adequate degree of solubilisation.

Generally speaking, the higher, the temperature, the shorter the period needed to give the desired degree of solubilisation. During this period, the temperature may be varied within the range, for instance, it may be raised incrementally.

Proteolysis and saccharification

At the conclusion of the previous step, the liquefied mass is cooled to between about 40° and 65° C. preferably between about 50° and 60° C. Thereafter, the discrete protease enzyme and the β-amylase or source thereof are added, desirably at the preferred activity levels, and thoroughly dispersed in the medium by vigorous agitation. These enzymes may be added simultaneously, for instance, in the form of a mixture, or they may be added consecutively in either sequence without pause or after an interval of, for instance, about 15 minutes. If desired, the pH of the medium in this stage may be adjusted to between about 5 and about 6.5, preferably between about 5 and about 6.

During this period, the protease converts the protein into soluble nitrogen-containing compounds thereby providing nutrients for the subsequent yeast growth, and contributing toward characteristic properties of the beer, for example, foam and haze stability, and a smooth mellow palate.

The β-amylase in intimate contact with the starch attacks at the non-reducing ends of the amylose and amylopectin chains, and proceeds, by step-wise removal of maltose units. An inversion of the D-glucosidic linkage occurs, and the maltose liberated is of the β-configuration. Amylose with an even number of D-glucose units is converted completely to maltose while amylose with an odd number of units is converted to maltose and maltotriose which contains the reducing D-glucose unit of the original amylose chain. Amylopectin is hydrolysed like amylose beginning at the non-reducing ends of the outer chains. The main effect of the β-amylase attack is to produce reducing sugars (saccharification), principally maltose, which are available for subsequent conversion, in the fermentation process, to alcohol. Since there has already been considerable fragmentation of the starch chains in the preceding step involving α-amylase, giving many more intermediate or low molecular weight molecular weight molecules with many more ends at which the β-amylase can act quickly, the rate of fermentable sugar formation in this step is fairly rapid, and a high degree of conversion is attained.

Conveniently, ground barely malt, in an amount of between about 8 and about 20%, by weight, based on the weight of initial cereal grains, and with a diastatic value of between about 100° and 140° Lintner is used as the β-amylase source. The residence time in this temperature range needed to produce an acceptable soluble nitrogen content and fermentable sugar content varies depending, for instance, on the quantity and activity levels of the protease and malt. Usually, with the protease at an enzymatic level of 0.5 protease unit or more and with 8 to 20% malt of the preferred diastatic activity of between 100° and 140° Lintner, a residence time of between 30 and 120 minutes is satisfactory.

Wort separation

At the conclusion of the previous step, the mash is run-off into, for example, a conventional brewery lauter vessel, mash filter, or a centrifuge, such as a continuous de-sludging centrifuge, so as to separate the wort from the spent grains. A combination of centrifuging methods, such as lautering and centrifuging, may be used. The mash is preferably filtered without cooling, but, if desired, may be cooled before filtration. The filtered digest is then sparged and the wort brought up to the desired volume.

The wort so-obtained may be used directly in making beer by the conventional process steps, so serving as a full replacement for a conventionally produced wort, which simplifies the plant required and results in other economies. Alternatively, the wort may be evaporated to a syrup which may then be stored until required, say, to increase the throughput of a conventional process at peak times. Advantageously, the syrup contains between about 70 and about 85% by weight total solids, preferably about 75 to 80%.

In converting the wort into beer, the conventional procedures are employed. For instance, the wort is admixed with hops and boiled. The heat deactivates the enzymes and sterilises the wort, while the extraction of the hops provides flavour and preservative constituents. The wort is thereafter cooled and fermented by the addition of an appropriate brewers' yeast, such as a "bottom yeast" commonly employed in the manufacture of the type of alcoholic beverage generally known as lager, and a "top yeast" commonly employed in the manufacture of the type of alcoholic beverage generally known as ale. The yeast utilises the normally fermentable sugars which are present in the wort. The primary fermentation of the wort (bottom yeast) typically takes place at about 7° to 14° C., and usually takes from 3 to 10 days. This is followed by the secondary or "lager" fermentation usually as 0° to 5° C. for about two to eight weeks or longer. Thereafter, the beer is clarified or filtered, carbonated and packaged.

A preferred process according to this invention is illustrated in the flow sheet given as FIG. 1 of the accompanying drawings.

Figure 3:
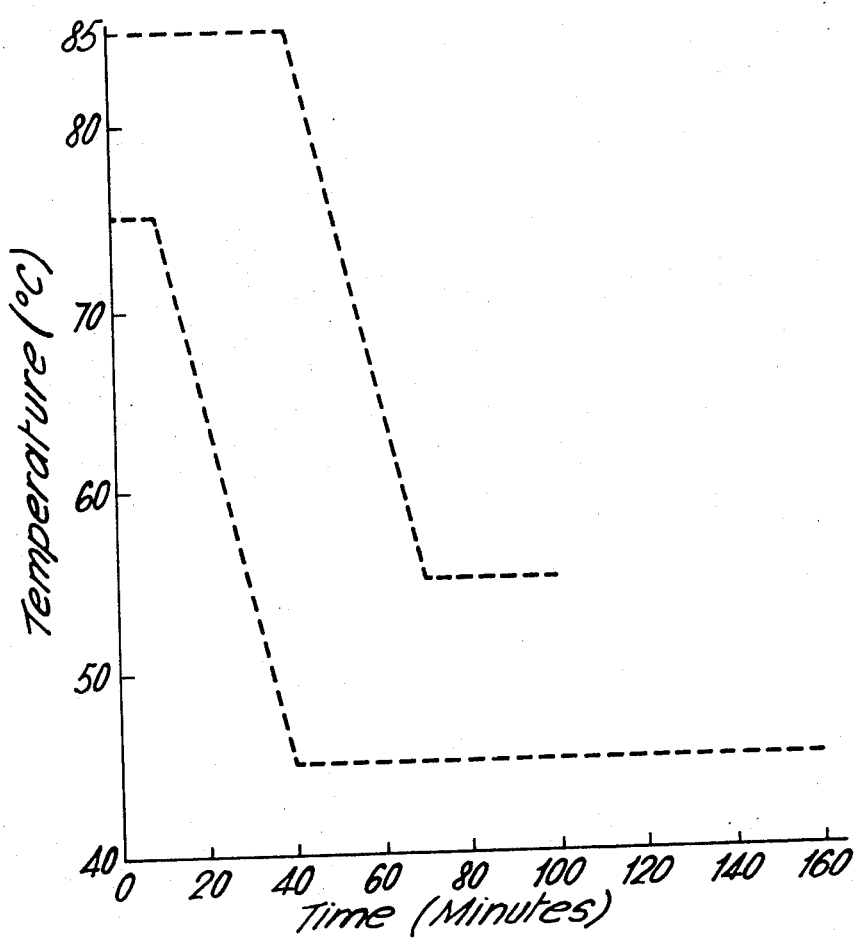
FIG. 3 is a graph giving temperature and time ranges delineating satisfactory mash cycles in the preferred embodiment.

Referring to this figure, the process disclosed in the flow sheet, involves commingling in a reaction vessel, ground unmalted barley grains and a bacterial α-amylase enzyme derived from a *Bacillus subtilis* strain at a level of at least 45 α-amylase units per gm. of barley grains and, which also contains at least 0.5 protease unit per gm., and water, in proportions such that the solids:water ratio is 1:2.5 to 1:5. This aqueous slurry is then heated to between about 75° to about 85° C., and, with continuous stirring, held at a temperature in this range for about 10 to 40 minutes during which time the starch in the cereal grains is gelatinised and liquefied by the α-amylase enzyme. Simultaneously with this treatment of the barley substrate, a cereal adjunct is prepared in a pre-cooking operation. This involves the initial formation of an aqueous slurry of raw corn grits and a salt stabilised α-amylase-containing enzyme, at a level of at least 10 α-amylase units. For convenience, the enzyme mixture used in the barley treatment is also employed in this step as the α-amylase source. This corn mash is then heated to 70° to 80° C. for 10 to 30 minutes in order to gelatinise and liquefy the raw corn grits. It is then briefly boiled, after which the liquefied mash is dropped into and dispersed, by stirring, in the liquefied cereal substrate (in the original reaction vessel or in the other vessel that may be used for the subsequent process steps). Thereafter, in the same or in a different vessel, the liquefied medium is cooled to between about 50° and about 60° C. With the medium in this temperature range, a discrete protease enzyme at an activity level of at least 0.5 protease unit per gm. of barley grains and 8 to 12% by weight, based on the weight of initial cereal grain, ground barley malt with a diastatic value of between about 100° and 140° Lintner are dropped in simultaneously and dispersed by stirring. The mass is usually held at such a temperature for between about 30 and about 120 minutes in order to achieve a sufficiently high concentration of soluble nitrogen compounds and fermentable sugars as indicated by the formol nitrogen content and apparent attenuation of about 200 to 250 mg./litre and about 75% respectively. Immediately thereafter, the mash is filtered and the wort collected. The temperature/time relationships, in the overall mash cycle in the preferred process are shown in FIG. 3 of the accompanying drawings.

Following the foregoing sequence of process steps, a properly balanced, light-coloured wort with satisfactory starch and protein breakdown is obtained. Moreover, such a wort normally has higher fermentable sugar and nitrogen contents, as indicated by apparent attenuations of around 72 to 75% or more, total nitrogen levels of around 725 to 900 mg./litre or more and formol nitrogen levels of around 200 to 250 mg./litre or more, compared with the worts than can be consistently obtained following the teachings of the aforementioned prior art specification.

Figure 2:
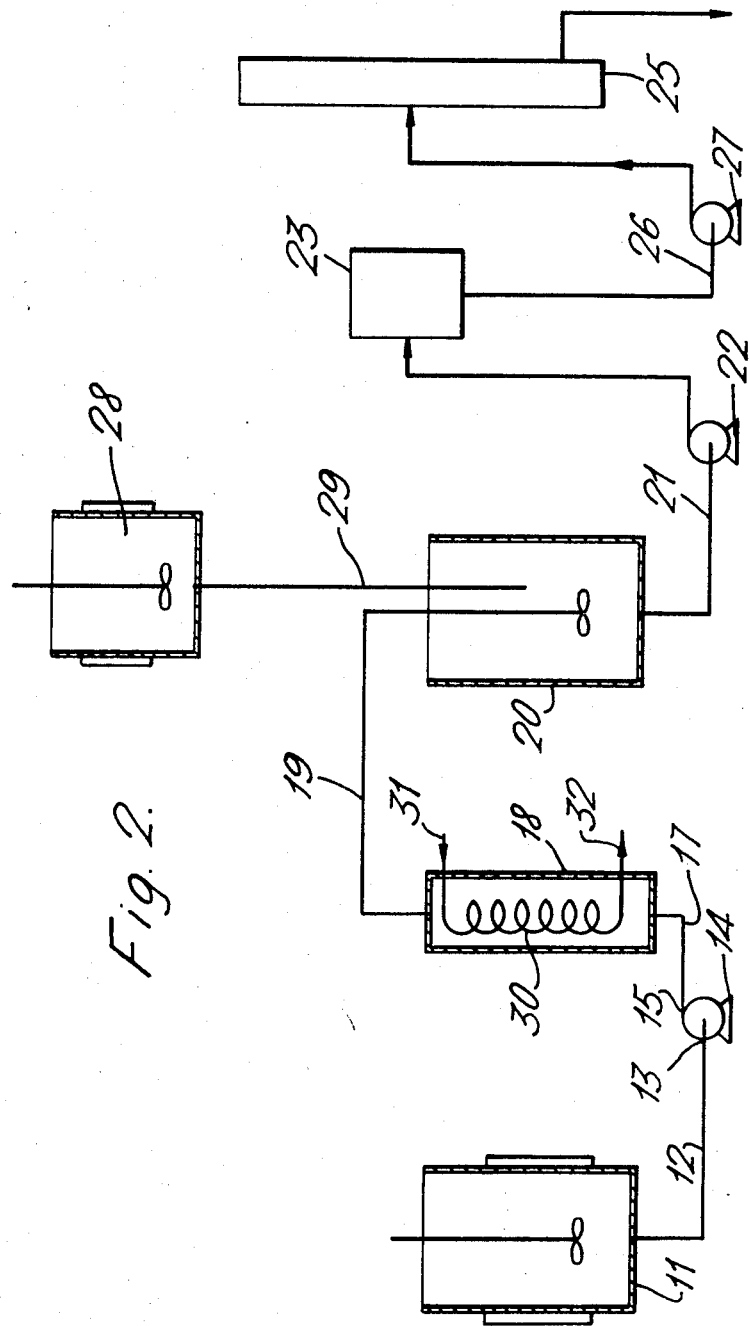
FIG. 2 is a block diagram showing an apparatus assembly which may be used in the preferred embodiment.

An apparatus assembly that may be used in practising the preferred process according to this invention is diagrammatically illustrated in FIG. 2 of the accompanying drawings.

Referring to this figure, 11 indicates a stirred tank reactor, lagged for insulation, in which the discrete α-amylase enzyme is added to an aqueous slurry of ground barley grains. The reactor 11 is connected via pipe 12 to the inlet 13 of an appropriate pump 14. Conveniently, the pump is a displacement type, e.g. of the centrifugal or reciprocating type. In such a pump, the pumped fluid is transported to an outlet 15, for example, by a diaphragm hydraulically operated by means of a reciprocating piston. The outlet 15 of the reciprocating pump is connected through a pipe 17 with a heat exchanger 18. An outlet end of this heat exchanger is connected by pipe 19 to a stirred tank reactor 20, from which a pipe 21 leads to a conventional filter press or continuous centrifuge 23 via pump 22. This filter press is connected to an evaporator 25 by a pipe 26 and pump 27. A corn cooker 28 is located above the stirred tank reactor 20 to which it is connected by pipe 29.

The heat exchanger 18 is a spiral tube heat exchanger acting as a cooler in which the medium is cooled by means of a cooling fluid flowing through a stainless steel closely spaced spiral coil 30. The cooling fluid is supplied through pipe 31 and discharged through pipe 32. Alternatively, a concentric tube or parallel plate exchanger may be used.

The slurry in the stirred tank reactor 11 is heated by direct steam injection to an initial temperature of between about 75° and about 85° C. and, with continuous and vigorous agitation, held at this temperature for between about 40 to 60 minutes. Thereafter, with liquefaction (solubilisation) substantially complete, so that the medium is no longer susceptible to gelatinisation on cooling, the liquefied mass is continuously passed, by the reciprocating, diaphragm-type, pump 14 from the reactor 11, through the pipes 12 and 17, and the heat exchanger 18 in which it is cooled. Advantageously, the width of the pipe 17, and the pressure and velocity of the medium emerging from the pump are so selected that the medium, while flowing through the pipe is subjected to substantial shearing forces thereby reducing the viscosity of the medium which can be advantageous subsequently in facilitating uniform distribution of the protease and saccharifying β-amylase enzyme.

From the heat exchanger 18, the medium, at or about the appropriate temperature for proteolysis and saccharification passes to the stirred tank reactor 20. The liquefied cereal adjunct from the corn cooker 28 is dropped into the reactor through the pipe 29, and thoroughly dispersed in the medium by stirring. Thereafter, with the temperature of the medium in the range of between about 50° and 60° C. the protease and ground barley malt are added and dispersed by vigorous stirring. After proteolysis and saccharification is complete, the medium from the reactor is passed to the filter press 23 via pipe 21 and pump 22.

The filtrate may be used directly in the manufacture of beer or passed to the evaporator 25 via pipe 26 and pump 27 in which the wort is concentrated to a syrup ready for storage.

In a modified apparatus assembly according to this invention the liquefaction of the starch is effected, not in the reactor 11, but in a heat exchanger located between the pump 14 and the heat exchanger 18. This heat exchanger may be of the concentric tube type comprising three tubes with the medium passing in the interior of the second tube, i.e. in the annular space between the first (innermost) and second tube. Steam may be supplied to the interior of the innermost tube and to the interior of the outermost tube, thereby forming a steam jacket around the medium in the annular passage defined by the innermost and the second tube. A suitable arrangement of pipes provides for ingress and egress of the steam.

The following example is given for the purpose of illustrating this invention and facilitating a better understanding thereof.

EXAMPLE 1

Part A—Raw materials (a) Barley: Conquest barley was used. This barley was cleaned and then hulled giving around 10% w./w. hulls, and the hulls separated by aspiration. The barley kernels were then ground in a Hobart Model 2020 Grinder adjusted to No. 1 setting. The ground grains were then mixed with the hulls. The mixture had the following spectrum determined by screen analysis (U.S.A. Standard Size).

Mesh No.: Percent w./w. passing through
10 ---------------------------------------- 2
14 ---------------------------------------- 24
18 ---------------------------------------- 45
30 ---------------------------------------- 17
60 ---------------------------------------- 8
100 --------------------------------------- 2
Pan --------------------------------------- 2

(b) Water: Standard brewing water was used with a total hardness of around 30 p.p.m. and a pH of between 5.3 and 5.6.

(c) Salt addition: 6 gms. gypsum and 9.5 g. calcium chloride per 12½ imperial gallons were added to the water used for slurrying the barley.

(d) Enzymes.—(i) α-amylase: In this example, the α-amylase enzyme was used in the form of a discrete enzyme mixture derived from fermentation using a *Bacillus subtilis* strain (ATCC 21556) and prepared following essentially the same procedure as set forth in Example 2 in our co-pending application No. 52,999 filed on July 7, 1970. In this instance, the filtrate obtained assayed as follows:

Amylase activity: 1600 modified Stein-Fischer units/ml.
Protease activity: 10.0 modified Kunitz units/ml.
Neutral protease: 6.2 modified Kunitz units/ml.
Alkaline protease: 3.8 modified Kunitz units/ml.

The broth was stabilised by the addition of propylene glycol (5.0% w./v.) and potassium sorbate (1% w./v.).

(ii) Protease: The protease enzyme used was a commercial bromelain, obtained from Mann Research Laboratories, New York, U.S.A. This particular bromelain was in solid form.

(iii) β-Amylase: Ground barley malt was used as the β-amylase source with a diastatic activity of 137° Lintner. The grist spectrum as determined by screen analysis (U.S.A. Standard Size) was as follows:

Mesh No.: Percent w./w. passing through
10 ---------------------------------------- 10
14 ---------------------------------------- 16
18 ---------------------------------------- 26
30 ---------------------------------------- 28
60 ---------------------------------------- 12
100 --------------------------------------- 4
Pan --------------------------------------- 4

(e) Corn grits: Raw corn grits with a moisture content of 11.5% w./w. were used as a cereal adjunct. The spectrum as determined by screen analysis (U.S.A. Standard Size) was as follows:

Mesh No.: Percent w/w. passing through
30 ---------------------------------------- 15.5
60 ---------------------------------------- 80
100 --------------------------------------- 2.5
Pan --------------------------------------- 2

(f) Mash bill:

| Constituent | Total weight, kg. | Ratio | Extractable weight, kg. |
|---|---|---|---|
| Barley | 6.205 | 64 | 3.850 |
| Raw corn grits | 3.468 | 36 | 2.850 |
| Malt (β-amylase source) | 0.610 | | 0.427 |

Part B—Mash cycle

The enzymatic conversion was effected in the apparatus assembly shown in FIG. 2.

Figure 4:
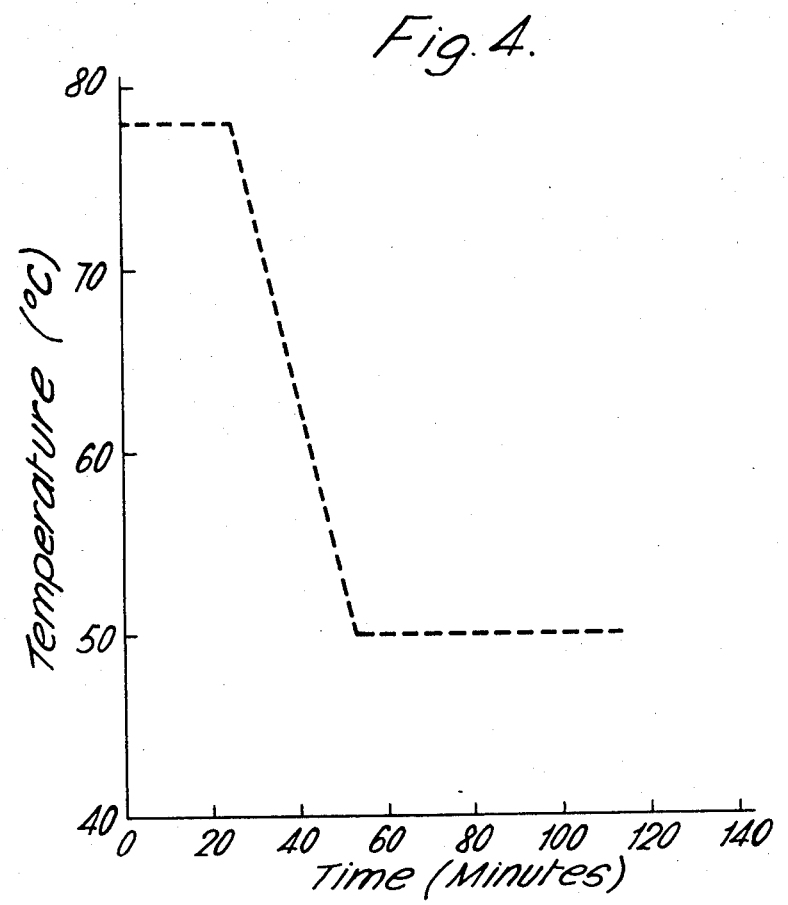
FIG. 4 is a graph showing the temperature/time profile of the mash cycle employed in the procedure of example herein.

The temperature/time relationships in the mash cycle followed is indicated in the graph reproduced as FIG. 4 of the accompanying drawings.

Step (i) 24 litres of water were added to the stirred tank reactor 11, and the salt-stabilised enzyme-containing broth slowly stirred in at an enzymic level of 115α-amylase units and 0.7 protease unit per gm. of barley subsequently to be incorporated. Thereafter, 6.205 kg. ground barley were added. The slurry so-obtained was vigorously stirred.

Step (ii): The temperature of the aqueous slurry was raised to 78° C. (come-up time=15 minutes) by direct steam injection. This temperature was held for 25 minutes, during which time the slurry was continuously stirred, and the α-amylase enzyme liquefied (solubilised) the barley grains with the production of oligosaccharides and branched limit dextrins.

Step (iii): The liquefied mass was then conveyed via the reciprocating, diaphragm-type pump 14 from the reactor 11, through the pipes 12 and 17 and the heat exchanger 18 in which it was cooled. The residence time in the heat exchanger was around 20 minutes, at the end of which period the temperature of the medium had fallen to about 56° to 60° C.

Step (iv): Simultaneously with the liquefaction of the barley grain substrate, the cereal adjunct which, in this instance, was derived from raw corn grits, was prepared. 12 litres of water were added to the corn cooker 12, and the salt-stabilised enzyme-containing broth (as used in step (i)) slowly stirred in at an enzymatic level of 14 α-amylase units per gm. of raw corn grits subsequently to be incorporated. 3.458 kg. raw corn grits were then added, and the slurry vigorously stirred. The slurry was first heated to 71° C., and this temperature held for 16 minutes. Thereafter, the corn mash was brought to the boil (come-up time≅2 minutes), and held at boiling point for 2 minutes.

Step (v): From the heat exchanger, the medium from step (iii) was passed through pipe 19 to the second stirred tank reactor 20. The liquefied mash from the corn cooker in step (iv) was then dropped via pipe 29 into the liquefied medium in the stirred tank reactor 20. The combined mass was vigorously stirred to disperse the liquefied corn mash. Thereafter, the bromelin protease enzyme and the ground barley malt were added simultaneously and without interruption, and dispersed by stirring. The residence time in this reactor was 1 hour, and during this period the temperature was maintained at about 56° C. and the medium was continuously stirred.

Step (vi): At the end of this period, the proteolysed and saccharified mash was pumped, via pipe 21 and pump 22, to a conventional filter press 23 in which the mash was allowed to settle for about 10 minutes. It was noted that the clarity of the filtrate (wort) collected was good. The run-off time was about 25 minutes.

The wort so-obtained was light coloured, and had property balanced amino acid and carbohydrate spectra. This wort was then boiled in the kettle. Before the boil was started, 42.8 g. of hops were added to the wort in the kettle. The wort was boiled for 90 minutes. 30 minutes before the end of the boil, an additional 28.8 g. of hops and 2.9 g. Irish moss were added followed, 5 minutes before the end of the boil, with a further 14.4 g. of hops. During the open boil the volume fell by evaporation from 61 litres to about 56–59 litres. At the conclusion of the boil the wort was placed in the hop jack where it remained for 10 minutes. The wort was then slowly run into the pan where it was allowed to settle for 30 minutes. An analysis showing respective wort properties (after this boil) is given in Table I hereunder, which also includes, for comparative purposes, an analysis of a typical conventional wort suitable for the commercial manufacture of beer.

TABLE I

| Property: | Barley/enzyme wort | Conventional wort |
| --- | --- | --- |
| Extract (° P) | 11.7 | 11.9 |
| Total nitrogen (mg./litre) | 894 | 875 |
| Formol nitrogen (mg./litre) | 265 | 932 |
| pH | 5.2 | 5.1 |
| Apparent attenuation (percent) | 78 | 76 |

The amino acid spectrum of the wort when compared with the amino acid spectrum of a conventional malt wort showed no essential difference.

As an alternative to boiling, the wort may be concentrated as shown in the apparatus assembly of FIG. 2, in which the wort is passed via pipe 26 and pump 27 to the evaporator 25 in which it is concentrated, by evaporation, to a syrup.

Part C.—Brewing

The wort was converted directly into beer by the following procedure:

The boiled wort cooled to 14.4° C. in a plate cooker was run-off into a fermenter, and converted directly into beer by the following procedure.

(i) Fermentation: A lager yeast (*Saccharomyces carlsbergensis*) was added at a rate of 100 g. pressed yeast per 40 litres wort. Wort was placed in a glass carboy and oxygen bubbled through to give dissolved oxygen level of 20 p.p.m. The yeast was then pitched and well-mixed with the wort.

Fermentation was continued for 7 days at 14.4° C. At the end of the fermentation, the natural sulphur dioxide content of the primary storage beer was adjusted to 15 p.p.m. by the addition of sodium metabisulphite.

(ii) Aging: A stainless steel keg was used for aging. The beer was dropped into the keg, and 0.068 ml. of the chill proofing enzyme "Protesal" were added, and the keg put under 20 p.s.i.g. carbon dioxide pressure. Primary aging was effected at 1° C. for 14 days, after which the beer was passed to filtration.

(iii) Filtration: The primary filtration was made through a sparkler filter containing 34 g. of a diatomaceous earth filter aid. The beer was filtered into another keg to which was added 7 g. "Clearfil" (a synthetic silicate filter aid). The beer was then filtered again through a sparkler filter containing 23 g. of a diatomaceous earth filter aid into another keg. Following secondary filtration the beer was carbonated to 2.8–3.0 volumes.

(iv) Bottling: The beer was bottled with the keg under 15 p.s.i.g. $CO_2$; before capping the bottle was tapped to release dissolved oxygen.

(v) Pasteurization: The beer was pasteurized by heating at 60° C. for about 2 minutes. The total time in the pasteurizing tunnel was 26.6 minutes, with an exit temperature of about 27° C.

(vi) Storage: The bottled beer was stored in a refrigerator at +4° C. Tasting was made immediately after bottling and during storage. The mature beer was judged by means of physico-chemical analysis and organoleptic tests. This analysis, as well as the analysis of a commercial control beer derived from a conventional wort, included for comparative purposes, is shown in Table II below.

TABLE II

| Property: | Barley/enzyme wort | Conventional wort |
| --- | --- | --- |
| Apparent extract (percent) | 2.5 | 2.4 |
| Real extract (percent) | 4.20 | 4.16 |
| Alcohol (percent) | 3.8 | 3.8 |
| Original extract (percent) | 11.7 | 11.9 |
| Colour (SRM) | 3.2 | 3.1 |
| pH | 4.1 | 4.0 |
| Isohumolone (IBU) | 16 | 17 |
| Foam (SIG) | 138 | 134 |
| Diacetyl (p.p.m.) | 0.07 | 0.08 |
| Protein (percent) | 0.32 | 0.32 |
| $SO_2$ (p.p.m.) | 4.3 | 4.0 |
| Iron (p.p.m.) | 0.10 | 0.12 |
| Force haze test (1 week) | 140 | 200 |
| Dimethyl sulphide (p.p.b.) | 100 | 108 |
| Acetaldehyde (p.p.m.) | 4.3 | 4.1 |
| Ethyl acetate (p.p.m.) | 31 | 34.3 |
| n-Propanol (p.p.m.) | 5.6 | 6.7 |
| iso-Butanol (p.p.m.) | 18.0 | 20.7 |
| Amyl alcohol (p.p.m.) | 65.0 | 68.2 |

Referring to this table, it will be seen that the enzymatic beer is similar in most respects to the control beer, save that it has a markedly superior haze stability and generally a reduced level of fusel oils. With regard to organoleptic properties, the barley/enzyme beer had a crisp, beer palate. Statistical analysis of taste panel verdicts, showed that there was no clear preference for either, so that the enzymatic beer was just as acceptable as the commercial control beer.

In comparison with the beer derived from the process of the aforementioned prior art specification (in this case following the teaching of the example therein), the instant beer had a superior flavour, and a better stability, which probably reflects the fact that the wort from which it was made had a higher attenuation and formol nitrogen content.

EXAMPLE 2

The raw materials used in this example were identical to those of the foregoing example except for the following differences:

(i) The enzyme mixture used assayed at 6370 modified Stein-Fischer α-amylase units per ml. and 44.3 modified Kunitz protease units per ml. and was obtained from *Bacillus subtilis* ATCC 21556 by a similar procedure to that described in Example 1 of the aforementioned copending application.

(ii) A coarser grind corn with the following sieve analysis was used:

| Mesh No.: | Percent w./w. retained on screen |
|---|---|
| 10 | -- |
| 14 | 0.75 |
| 18 | 10.3 |
| 30 | 37.25 |
| 60 | 44.75 |
| 100 | 4.6 |
| Pan | 2.4 |

The procedure followed in this example was the same as that in the foregoing example except that the enzyme mixture was used at a level to provide 100 α-amylase units and 0.7 protease unit per gm. of barley and the temperature during, and duration of, the solubilization (step ii) and proteolysis/saccharification (step v) steps were varied as shown in the table below. The worts so-obtained were analyzed before boiling for different properties and the results obtained for each run (conducted in duplicate) are summarized in Table III below:

TABLE III

| Step: | Before boiling | Results | | |
|---|---|---|---|---|
| Solubilization: | | | | |
| Temp. (° C.) | 70 | 75 | 80 | 85 |
| Time (mins.) | 30 | 30 | 30 | 30 |
| Proteolysis/saccharification: | | | | |
| Temp. (° C.) | 60 | 55 | 50 | 45 |
| Time (mins.) | 60 | 60 | 60 | 60 |
| Wort property: | | | | |
| Wort extract (° P) | 10.0 | 10.4 | 10.6 | 10.3 |
|  | 10.0 | 10.3 | 10.5 | 10.3 |
| Formol/nitrogen (mg./litre) | 192 | 205 | 208 | 191 |
|  | 190 | 201 | 195 | 197 |
| Q.F | 2.6 | 2.65 | 2.55 | 2.6 |
|  | 2.45 | 2.7 | 2.65 | 2.7 |
| Attenuation (percent) | 74.0 | 74.5 | 75.9 | 74.7 |
|  | 73.5 | 73.8 | 74.8 | 73.8 |

Each of the worts was fermented into good quality beer by the procedure of Example 1.

What is claimed is:

1. A process for producing a brewers' wort from an aqueous mash containing raw cereal grains and less than 30% by weight malt by the action of enzymes whereby proteins present in the raw cereal grains are converted into soluble nitrogen-containing compounds and carbohydrates present in the cereal grains are solubilized and converted by saccharification into sugars which comprises:
   (a) commingling an aqueous slurry of raw cereal grains selected from the group consisting of barley, rye, wheat, buckwheat or mixtures thereof and discrete α-amylase enzyme to form said mash, the α-amylase being present in an amount effective to liquefy carbohydrates present in the mash for brewers' wort production but not less than 45 modified Stein-Fischer α-amylase per gram of raw cereal grains;
   (b) raising the temperature of said mash to between about 65° and about 90° C.;
   (c) maintaining the temperature of said mash within the range defined in step (b) for between about 10 and about 90 minutes to liquefy carbohydrates present in the mash;
   (d) thereafter without further heating, cooling the resultant mash to a temperature between about 40° and about 65° C. from a higher temperature within the range defined in step (b);
   (e) Introducing into said cooled mash a discrete protease enzyme and a discrete β-amylase enzyme or source thereof, and converting protein to water soluble nitrogen containing compounds and converting carbohydrates present in the mash into sugars by holding the mash at a temperature within the range of step (d) for a time sufficient to produce a mash suitable for separating liquid to produce a brewers' wort, said protease being present in an amount effective to convert protein present in the mash into soluble nitrogen-containing compounds for brewers' wort production but not less than 0.5 modified Kunitz units per gram of raw cereal grains, and said β-amylase being present in an amount equivalent to between about 8 and about 30 percent of malt by weight based on the weight of raw cereal grains; and
   (f) separating the liquid in the mash so-obtained from the solid material therein to produce said brewers' wort.

2. A process as claimed in claim 1, wherein the mash is held at the temperature within the range defined in step (e) for between about 30 and about 120 minutes.

3. A process as claimed in claim 1, wherein the protease and α-amylase enzymes are derived from a fermentation of *Bacillus subtilis, Bacillus amyloliquefaciens, Bacillus polymyxa, Bacillus coagulans, Bacillus cereus,* or *Bacillus megaterium*.

4. A process as claimed in claim 1, wherein the source of β-amylase is malt or malt extract.

5. A process as claimed in claim 1, wherein a cereal adjunct is introduced into the mash in an amount between about 10 and about 60 percent by weight of the raw cereal grains.

6. A process as claimed in claim 5, wherein said adjunct is introduced before step (e).

7. A process as claimed in claim 5, wherein said adjunct comprises a liquefied raw cereal grain selected from the group consisting of liquefied corn grits, corn meal, sorghum, wheat flour, rice, corn starch, barley flour and rice meal.

8. A process as claimed in claim 5, wherein said adjunct is a material selected from the group consisting of pre-gelatinized corn flakes and glucose.

9. A process as claimed in claim 1, wherein said β-amylase is used in an amount equivalent to between about 8 and about 20 percent of malt by weight based on the weight of raw cereal grains, said protease is present in an amount of at least 0.9 modified Kunitz protease units per gram and said α-amylase is present in an amount of at least 100 modified Stein-Fischer α-amylase units per gram.

10. A process for the production of a fermented alcoholic beverage, wherein bittering adjunct is added to the wort obtained by the process of claim 1 and the mixture is subjected to alcoholic fermentation.

References Cited

UNITED STATES PATENTS

| 2,790,718 | 4/1957 | Nugey | 99—52 X |
| 3,081,172 | 3/1963 | Dennis et al. | 99—51 |
| 1,852,418 | 4/1932 | Koch | 99—27 |
| 3,290,153 | 12/1966 | Bayne et al. | 99—52 |
| 3,533,960 | 11/1967 | Bavisotto | 99—52 |

OTHER REFERENCES

MacWilliam, et al., Wort From Green Malt and Unmalted Cereals, J. Inst. Brem, vol. 69, 1963 (pp. 303–308).

Clerck, J. D. A Textbook of Brewing, Chapman & Hall, Ltd., London, 1957, vol. 1 (pp. 257–266).

A. LOUIS MONACELL, Primary Examiner

D. M. NAFF, Assistant Examiner

U.S. Cl. X.R.

99—51